US011945061B2

(12) United States Patent
Marelli et al.

(10) Patent No.: US 11,945,061 B2
(45) Date of Patent: Apr. 2, 2024

(54) EQUIPMENT FOR FITTING PANELS FOR INSULATING COVERS

(71) Applicant: SAIP S.R.L.-IMPIANTI PER POLIURETANI, Inverigo (IT)

(72) Inventors: Carlo Marelli, Inverigo (IT); Klaus Roland Rast, Inverigo (IT)

(73) Assignee: SAIP S.R.L.—IMPIANTI PER POLIURETANI, Inverigo (IT)

(*) Notice: Subject to any disclaimer, the term of this patent is extended or adjusted under 35 U.S.C. 154(b) by 0 days.

(21) Appl. No.: 18/177,512

(22) Filed: Mar. 2, 2023

(65) Prior Publication Data

US 2023/0278151 A1 Sep. 7, 2023

(30) Foreign Application Priority Data

Mar. 2, 2022 (IT) ...................... 10 2022 000003875

(51) Int. Cl.
*B23P 19/04* (2006.01)
*B23P 19/00* (2006.01)
(Continued)

(52) U.S. Cl.
CPC ............ *B23P 19/04* (2013.01); *B23P 19/002* (2013.01); *B23P 19/004* (2013.01); (Continued)

(58) Field of Classification Search
CPC ..... B23P 19/002; B23P 19/003; B23P 19/004; B23P 19/0007; B23P 19/008; B23P 19/10; B23P 19/107; B23P 21/004; B23P 23/04; B23P 23/06; B23P 2700/12; B23P 19/04; Y10T 29/49629
See application file for complete search history.

(56) References Cited

U.S. PATENT DOCUMENTS

| | | | | |
|---|---|---|---|---|
| 4,195,460 | A | 4/1980 | Anderson | |
| 2003/0172524 | A1* | 9/2003 | Glenn | B27M 3/0073 29/809 |
| 2010/0077697 | A1 | 4/2010 | Rider | |

FOREIGN PATENT DOCUMENTS

| | | | |
|---|---|---|---|
| GB | 2139527 | A | 11/1984 |

OTHER PUBLICATIONS

Italian Search Report Received for Italian Application No. IT 2022 000003875 dated Oct. 14, 2022, 10 pgs.

* cited by examiner

*Primary Examiner* — Jermie E Cozart
(74) *Attorney, Agent, or Firm* — Merchant & Gould P.C.

(57) ABSTRACT

Equipment for fitting panels for insulating covers, such as “standing seam” panels for insulating housing roofs, includes an upper sheet, a lower sheet and an expanded polymer intermediate layer. A working unit extends along a longitudinal axis, which corresponds to the working line of the panels. A supply unit is coupled to the working unit, by a transfer unit extending along a horizontal longitudinal axis perpendicular to the longitudinal axis of the working unit, for supplying reinforcement plates having a thrust portion and a flat portion. The working unit includes a carriage movable along the longitudinal axis. The carriage includes dies configured to cut and deform one end of the upper sheet of the panels and a thrust member for introducing reinforcement plates into a tail end of the expanded polymer intermediate layer. The thrust member is placed downstream of the dies along the working direction of the panels.

14 Claims, 15 Drawing Sheets

(51) Int. Cl.

| | |
|---|---|
| ***B23P 21/00*** | (2006.01) |
| ***B23P 23/06*** | (2006.01) |
| ***B32B 3/06*** | (2006.01) |
| ***B32B 5/18*** | (2006.01) |
| ***E04D 3/35*** | (2006.01) |
| ***E04D 3/362*** | (2006.01) |
| *B23P 19/10* | (2006.01) |
| *B23P 23/04* | (2006.01) |

(52) U.S. Cl.

CPC .......... *B23P 19/008* (2013.01); *B23P 21/004* (2013.01); *B23P 23/06* (2013.01); *B32B 3/06* (2013.01); *B32B 5/18* (2013.01); *E04D 3/352* (2013.01); *E04D 3/362* (2013.01); *B23P 19/003* (2013.01); *B23P 19/007* (2013.01); *B23P 19/10* (2013.01); *B23P 23/04* (2013.01); *Y10T 29/49629* (2015.01)

EQUIPMENT FOR FITTING PANELS FOR INSULATING COVERS

CROSS-REFERENCE TO RELATED APPLICATION

This U.S. patent application claims the benefit of Italian Application No. 10 2022 000003875 filed with the Italian Patent Office on Mar. 2, 2022, the entire contents of which is incorporated herein by reference.

TECHNICAL FIELD

The present invention relates to equipment for fitting panels for insulating covers, in particular panels of the "standing seam" type for insulating housing roofs. Specifically, the equipment of the invention is directed to an automatic system for cutting and deforming the sheet and providing the insulating panel with reinforcement plates.

BACKGROUND OF THE INVENTION

Panels of the "standing seam" type for insulating roofs of buildings, which are especially produced and used in the USA, allow creating a roof cover by interlocking the various panels and securing them to one another by means of fastening screws. They consist of a double sheet enclosing a polyurethane foam layer acting as an insulator in a sandwich-like manner. FIG. 1 illustrates a detail of two installed panels. The figure also shows a phantom view of the reinforcement plates which must be inserted into the polyurethane layer right below the sheet, so as to facilitate the final securing of the panels with the screws.

However, the installation of such panels exhibits a complexity regarding the longitudinal overlap thereof. As can be seen from FIGS. 2, 3A and 3B, in order to allow such an overlap, it is necessary to modify the profile of the sheet at the overlapping ends by deformation and cutting.

To date, these deformations, like the insertion of the reinforcement plates, are manually made off-line before sending the panels to the installation site. However, in addition to being costly (cost of labor, double movement of the panels with re-packaging), the manual operations can also be poorly precise and repetitive and in any case do not allow for high productivity.

Therefore, it is the object of the present invention to manufacture equipment which allows fitting the above insulating panels, i.e., deforming and profiling the sheet and inserting the reinforcement plates in an automatic, precise manner and with high productivity.

SUMMARY OF THE INVENTION

The present invention relates to equipment for fitting panels for insulating covers, in particular panels of the "standing seam" type for insulating housing roofs, as outlined in the appended claims, the definitions of which form an integral part of the present description.

In particular, the invention relates to:

1) equipment for fitting panels for insulating covers, in particular panels of the "standing seam" type for insulating housing roofs, comprising an upper sheet, a lower sheet and an expanded polymer intermediate layer, the equipment comprising a working unit extending along a longitudinal axis which corresponds to the working line of the panels, a supply unit being coupled to said working unit, by means of a transfer unit extending along a horizontal longitudinal axis perpendicular to the longitudinal axis of the working unit, for supplying reinforcement plates comprising a thrust portion and a flat portion, where the working unit comprises a carriage movable along the longitudinal axis, said carriage comprising dies configured to cut and deform one end of the upper sheet of said panels and a thrust member for introducing a plurality of reinforcement plates into a tail end of the expanded polymer intermediate layer, said thrust member being placed downstream of said dies along the working direction of said panels;
2) equipment as in 1), where the carriage comprises an upstream side and a downstream side and is connected at both the upstream side and the downstream side to a first end of corresponding pantograph support members, said pantograph support members comprising an articulated parallelogram bar system ending at the top with rollers adapted to support the panel sliding thereabove;
3) equipment as in 1) or 2), where the carriage comprises a first clamp for anchoring a first panel being worked and a second clamp for anchoring a second panel being worked, where the first clamp is placed upstream of the dies and the second clamp is placed downstream of the thrust member of the carriage, with respect to the feeding direction of the panels being worked;
4) equipment as in 3), where the second clamp is installed on a base movable along the longitudinal axis of the working unit between a proximal position and a distal position with respect to the thrust member of the carriage, where, in the proximal position, the second clamp moves integrally with the carriage, whereas, when switching from the proximal position to the distal position, the second clamp is subjected to a relative movement with respect to the carriage and therefore with respect to the first clamp along the sliding direction of the panels being worked;
5) equipment as in any one of 1) to 4), where the thrust member of the carriage comprises a frame movable between a lowered position, or an insertion position of the reinforcement plates into the panel, where said thrust member is at the intermediate layer of the panel, and a raised or loading position of the plates from the transfer unit to the carriage;
6) equipment as in 5), where the frame supports a template comprising a plurality of seats for the reinforcement plates, the frame further comprising a movable bar supporting a thrust plate provided with a plurality of downward protruding teeth, one for each reinforcement plate to be inserted into the panel, where the thrust plate is movable between a raised non-operating position and a lowered operating position, in which the teeth are placed in a thrust position at the seats of the template;
7) equipment as in 6), where the movable bar slides along the longitudinal axis of the working unit between a first position, in which the teeth of the thrust plate are vertically aligned with one end upstream of the seats of the template, and a second position, spaced apart from the first position along the sliding direction of the panel, in which the teeth are vertically aligned with the opposite end of said seats;
8) equipment as in any one of 1) to 7), where the reinforcement plate supply unit comprises a sequencer member and a carrier storage, the sequencer member comprising a vibrating tub which comprises, along the inner surface thereof, an ascending helicoidal guide, at the top of which a chute branches off, arranged outside the vibrating tub, configured to allow the movement and correct orientation of the reinforcement plates in progression towards the carrier storage;

9) equipment as in 8), where the chute comprises a distal portion comprising a rounded step and a guide in which the thrust portion of the reinforcement plates is inserted, so that the flat portion is oriented downwards by gravity;

10) equipment as in 8) or 9), where the carrier storage comprises a flat ribbon-shaped plaque, which unwinds parallel to the longitudinal axis of the transfer unit and on which a guide edge is arranged, the guide edge being vertically spaced apart from the flat plaque, so that there is a gap between the guide edge and the surface of the flat plaque adapted to cause the flat portion of the reinforcement plate to slide below the gap, and where the flat plaque distally comprises a reinforcement plate stop profile;

11) equipment as in any one of 1) to 10), where the reinforcement plate transfer unit comprises a bridge structure comprising a horizontal beam configured to straddle the working unit, the horizontal beam comprising a horizontal guide, arranged parallel to the longitudinal axis of the transfer unit, on which a slide comprising a plurality of seats is slidingly placed, each of which slides is dimensioned to accommodate a reinforcement plate, the slide being horizontally movable between a gripping position and a transfer position of the reinforcement plates;

12) equipment as in 11), where a gripping member of the reinforcement plates is secured onto the guide or beam or other structure connected thereto, at the stop profile of the carrier storage, and comprises a movable arm, which is transversely movable with respect to the flat plaque and the slide between a gripping position at the flat plaque and a release position at the slide;

13) equipment as in 12), where the movable arm distally comprises a vertical guide onto which a slider ending at the bottom with a bracket supporting suction heads is slidingly placed;

14) equipment as in any one of 11) to 13), a thrust member being secured onto the guide or beam or other structure connected thereto, at the transfer position, said thrust member of the transfer unit comprising a plate movable along an axis parallel to the longitudinal axis of the working unit, where the plate comprises a plurality of thrust teeth adapted to abut against the thrust portion of the reinforcement plates.

BRIEF DESCRIPTION OF THE DRAWINGS

Further features and advantages of the present invention will become more apparent from the description of some embodiments thereof, given below by way of a non-limiting indication, with reference to the following drawings.

DETAILED DESCRIPTION OF THE INVENTION

The present invention is directed to equipment for fitting panels for insulating covers, in particular panels of the "standing seam" type for insulating housing roofs. Specifically, the equipment of the invention is directed to an automatic system for cutting and deforming the sheet and providing the insulating panel with reinforcement plates.

Figure 1:
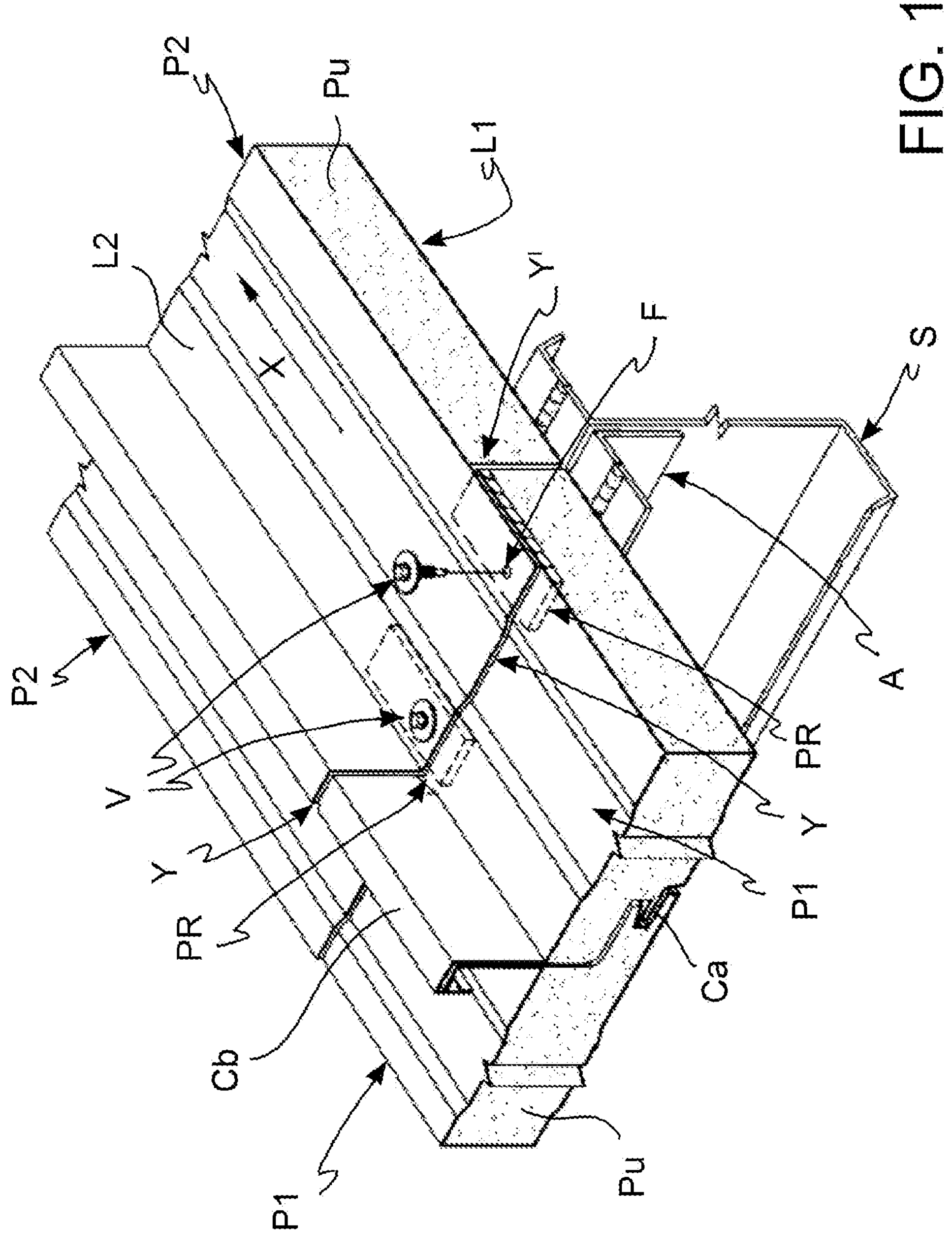
FIG. 1 depicts a perspective view of a detail of the installation of "standing seam" panels.

FIG. 1 shows the coupling of four panels P1, P2 (partially shown, cutaway view) resting on support flaps A of a support structure S of a building roof. The panels P1, P2 comprise a sandwich structure, having a polyurethane foam intermediate layer PU and lower L1 and upper L2 outer sheets. The panels P1 are mutually coupled transversely to the slope of the roof, while each of them is coupled to the corresponding panel P2 along the longitudinal direction (arrow X indicates the increasing inclination of the roof). Therefore, the panels P1 are mutually coupled by interlocking by means of first complementary profiles Ca, obtained in the inner sheet and the polyurethane foam, and second complementary profiles Cb, obtained in the upper outer sheet L2.

The securing of the panels to the roof is carried out by means of interlocking hooks in the joint area, which are secured to the structure of the warehouse by means of self-tapping screws. At the end of the securing operation, the joint is "seamed" with movable tools consisting of pairs of profiling rollers.

Vice versa, the longitudinal coupling between panels P1 and panels P2 is obtained by overlapping said upper sheets L2 (points Y, Y'). The coupling between panels P1, P2 is completed by securing with screws V passing through specific holes F made in the upper sheet L2 and through reinforcement plates PR embedded in the layer PU, right below the upper sheet L2. Thereby, the flat part of the covering sheet perfectly adheres to the covered sheet. Based on the inclinations of the roof and the local conditions, special sealants can be affixed between the covered sheet and the covering sheet. The assembly rules for assembling the panels are not the subject matter of the present patent.

Figure 2:
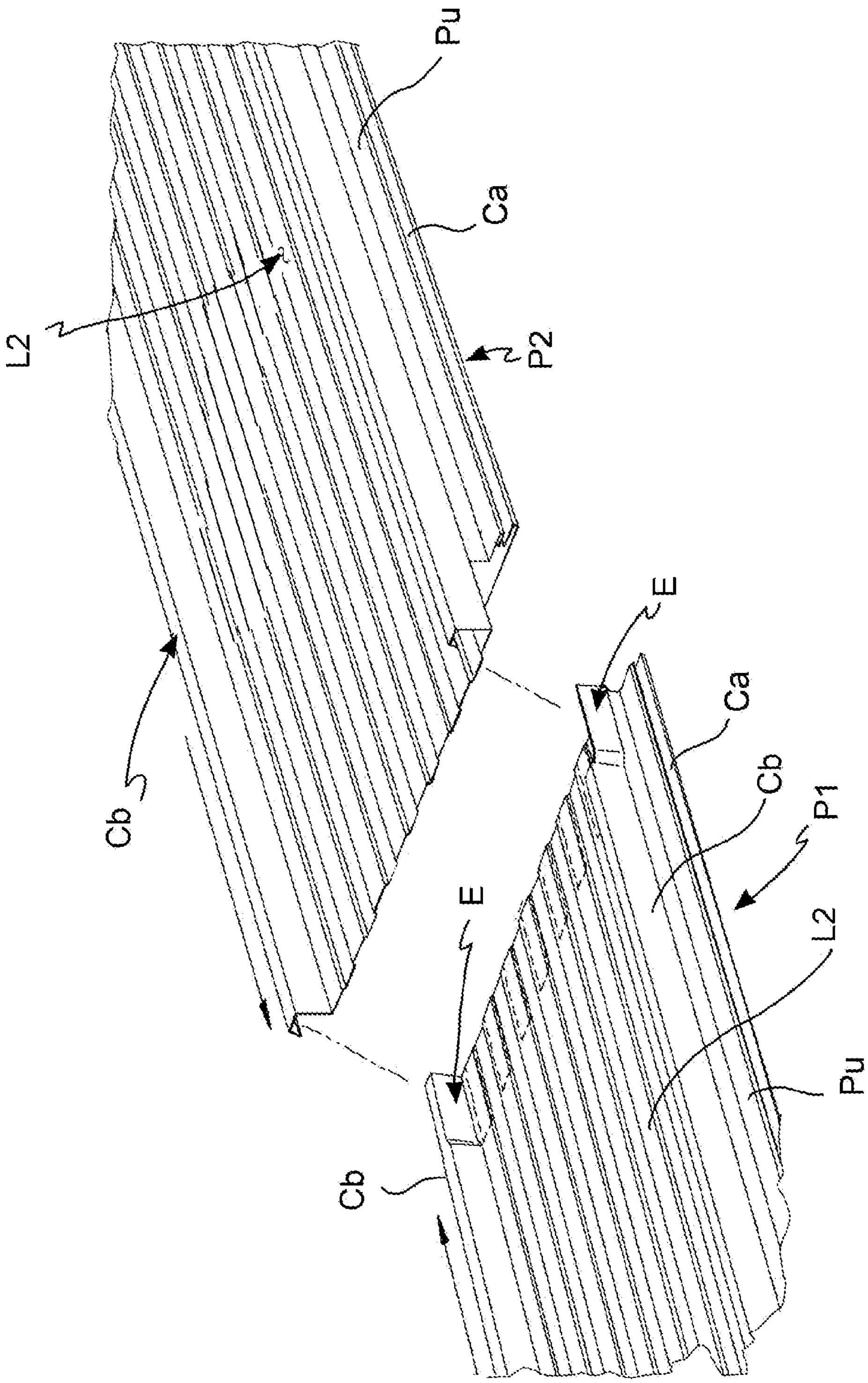
FIG. 2 depicts a perspective view of the overlapping coupling of two "standing seam" panels.
Figure 3A:
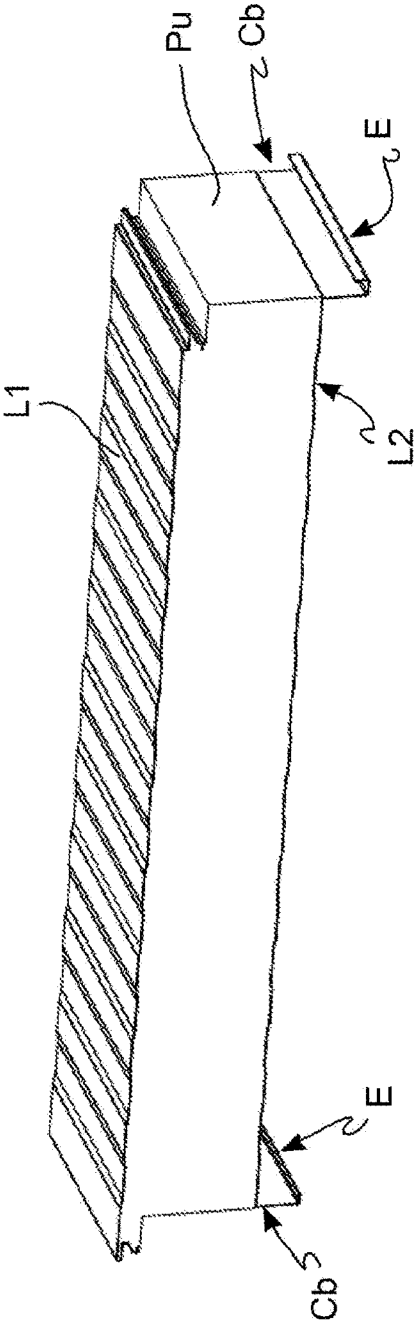
FIGS. 3A and 3B depict perspective views of a detail of a "standing seam" panel, before and after the operation of cutting and deforming the overlapping ends, respectively.
Figure 3B:
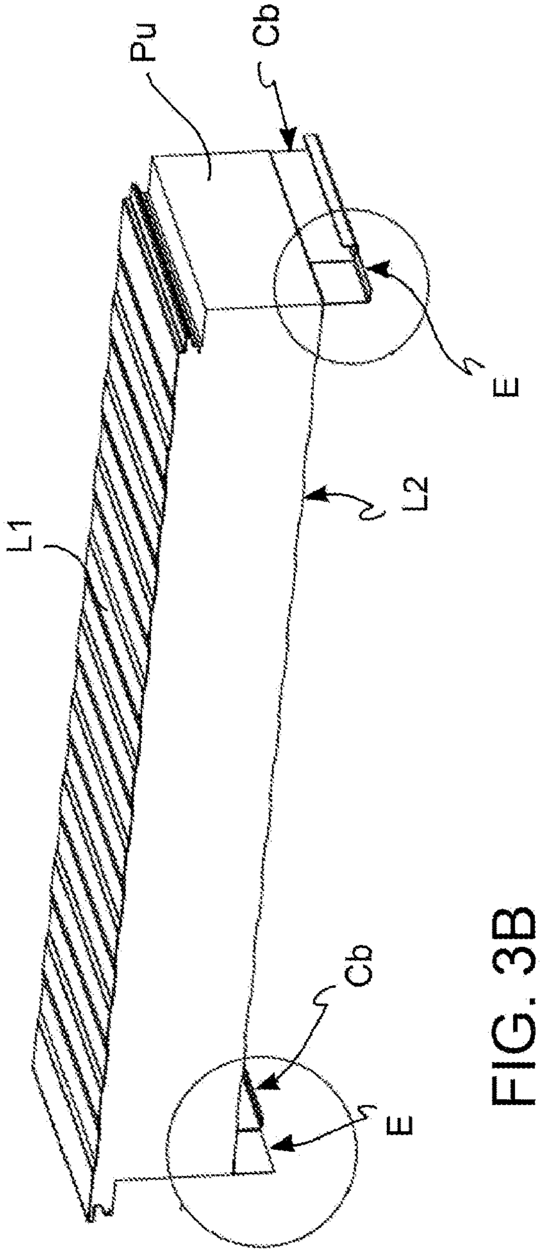

As shown in FIG. 2, in order to achieve the longitudinal coupling with overlap between the complementary profiles Cb of two upper sheets L2, it is necessary to deform the ends E of the profiles Cb and profile the ends at the same time. FIGS. 3A and 3B show an end portion of a panel, as exiting from the forming equipment (typically, double conveyor equipment of the known type) and the transversal cutting of the panel (FIG. 3A) and the same end portion, in which the ends E of the complementary profiles Cb have been modified to allow the on-site installation (FIG. 3B), respectively. As can be seen, both ends have been appropriately deformed and cut according to a geometry dictated by the typical shape of the "standing seam" panels.

As previously stated, such a deformation and cutting of the ends E, as the introduction of the reinforcement plates PR into the layer PU, are normally carried out manually on the panel P at the end of the production thereof. The equipment, which will be described below with reference to FIGS. 4-14, allows producing the final panel P (i.e., the panel fitted with the modifications at the ends E and with the reinforcement plates PR) in line, downstream of the panel forming equipment.

Figure 11:
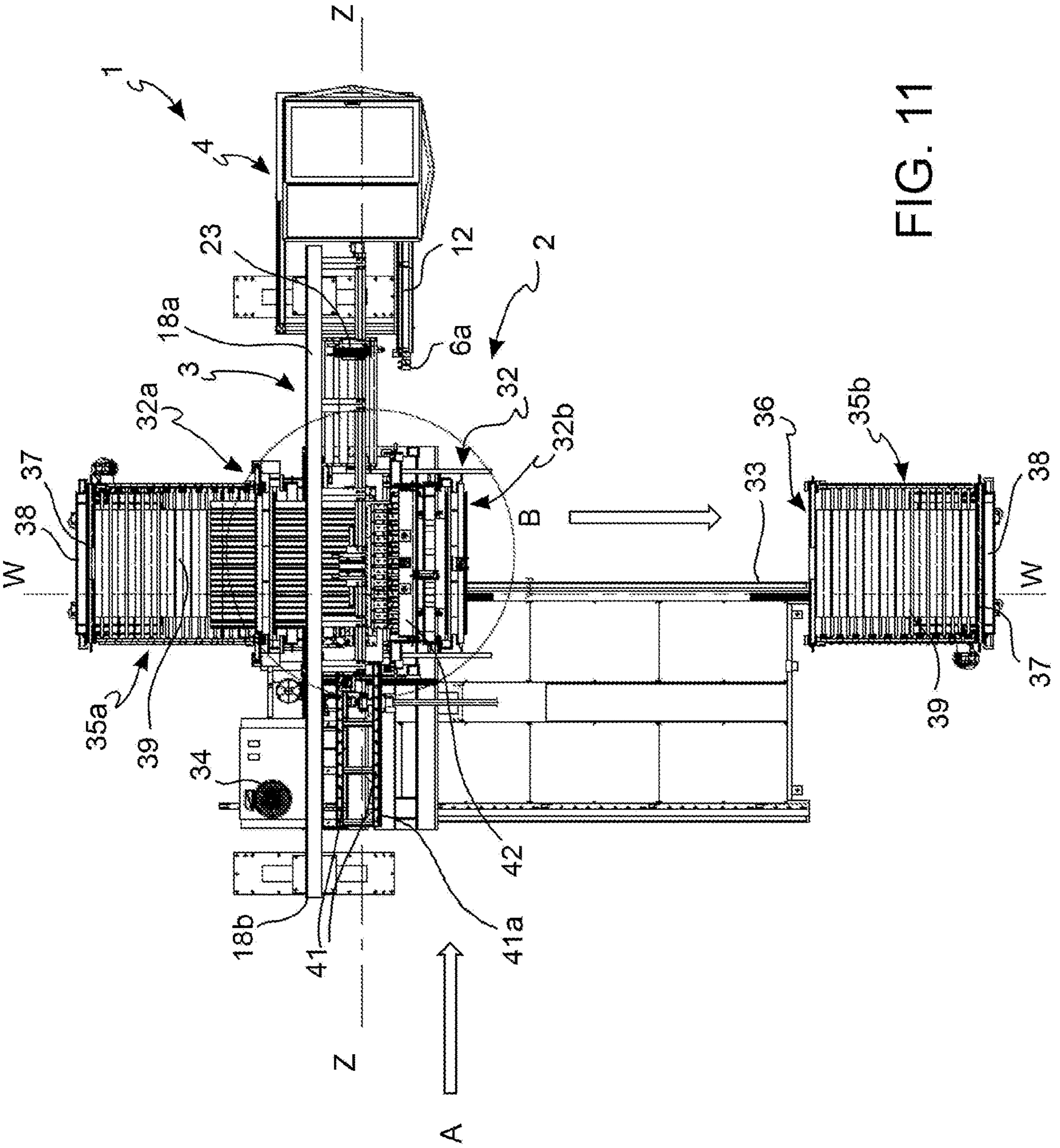
FIG. 11 depicts a top plan view of the equipment of the invention as a whole.

FIG. 11 shows a plan view of the equipment of the invention as a whole. Such equipment, indicated as a whole by reference numeral 1, comprises a working unit 2 extending along an axis W-W, which corresponds to the working line of the "standing seam" panel, a supply unit 4 being coupled to said working unit 2, by means of a transfer unit 3, for supplying reinforcement plates PR.

Figure 4:
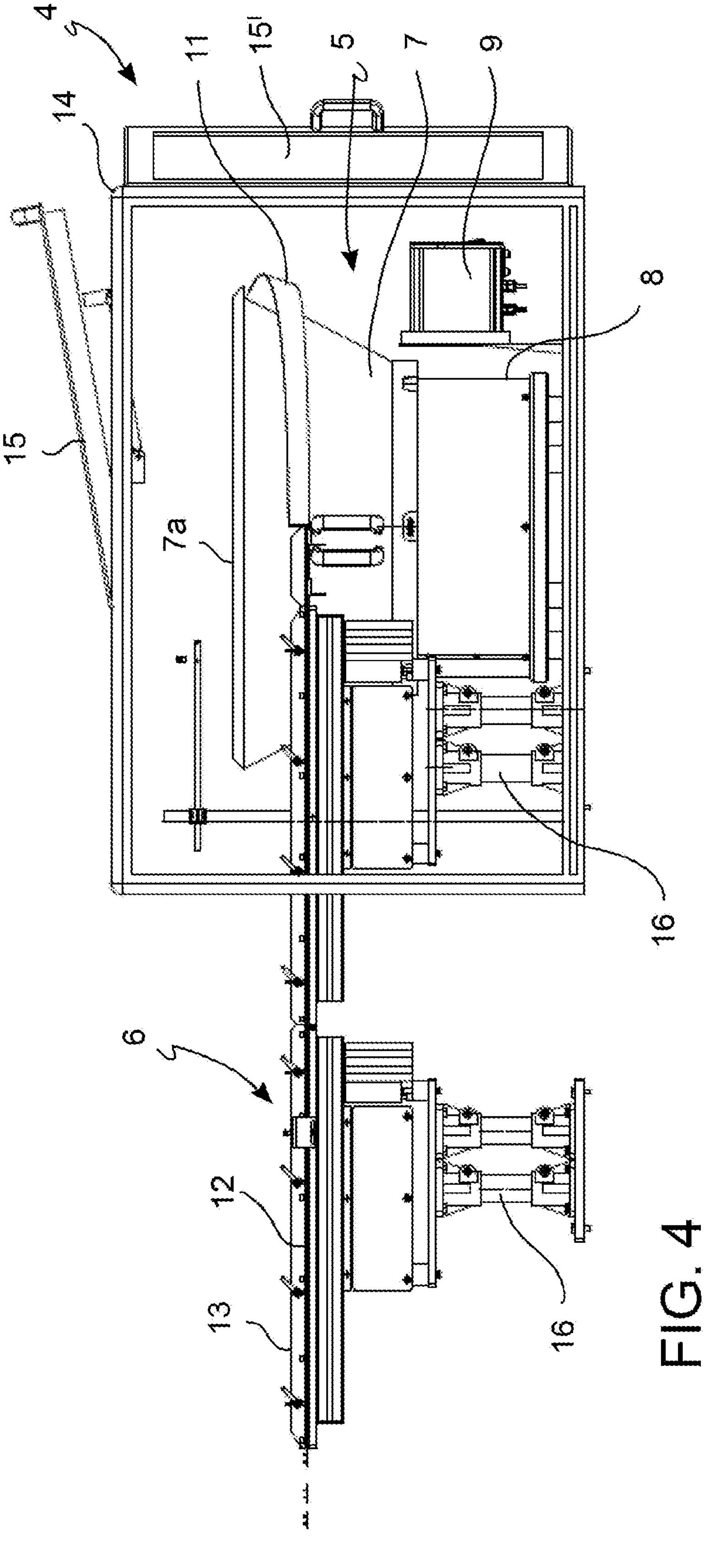
FIG. 4 depicts a side view of the supply unit for supplying the reinforcement plates of the equipment of the invention.
Figure 5:
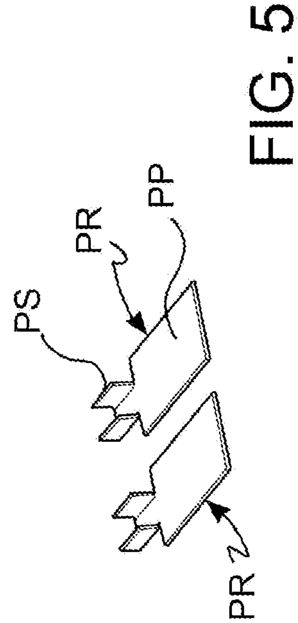
FIG. 5 depicts a perspective view of two reinforcement plates.
Figure 6A:
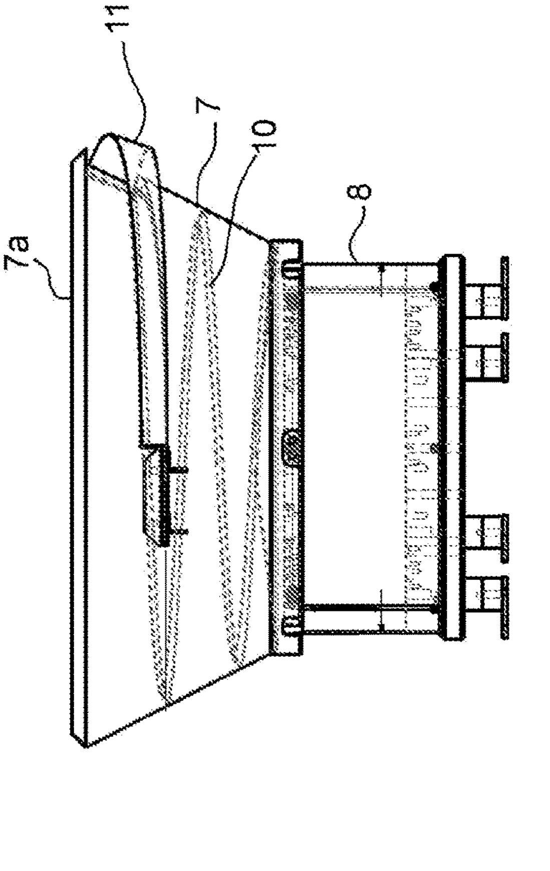
FIG. 6A depicts a phantom side view of a detail of the supply unit in FIG. 4.

With reference to FIGS. 4-6, the supply unit 4 for supplying the reinforcement plates PR comprises a sequencer member 5 and a carrier storage 6.

Figure 6B:
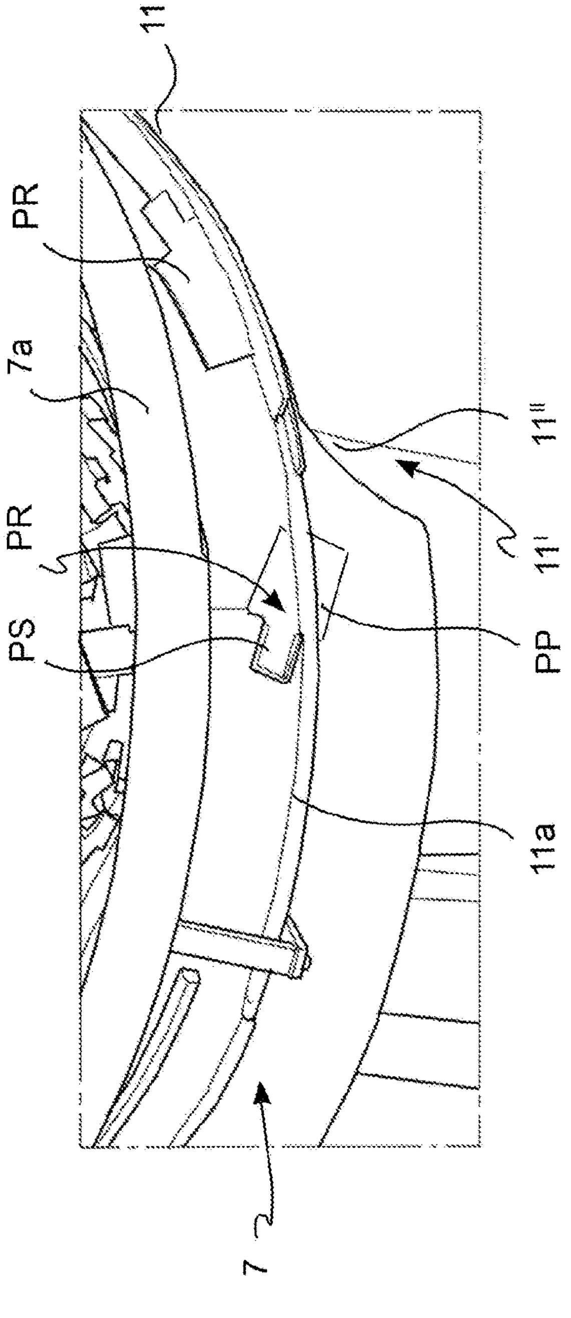
FIG. 6B depicts a three-dimensional view of a detail of the supply unit in FIG. 4.
Figure 7:
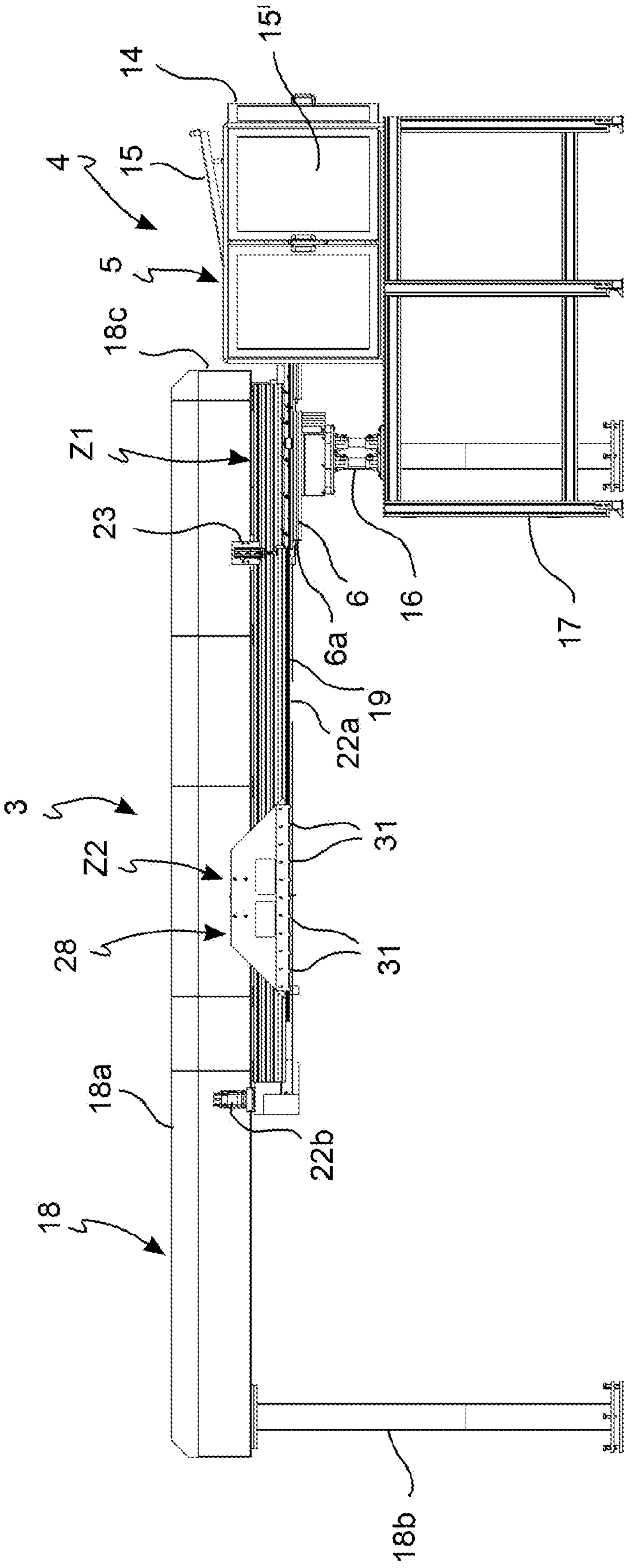
FIG. 7 depicts a side view of the reinforcement plate transfer unit.
Figure 8:
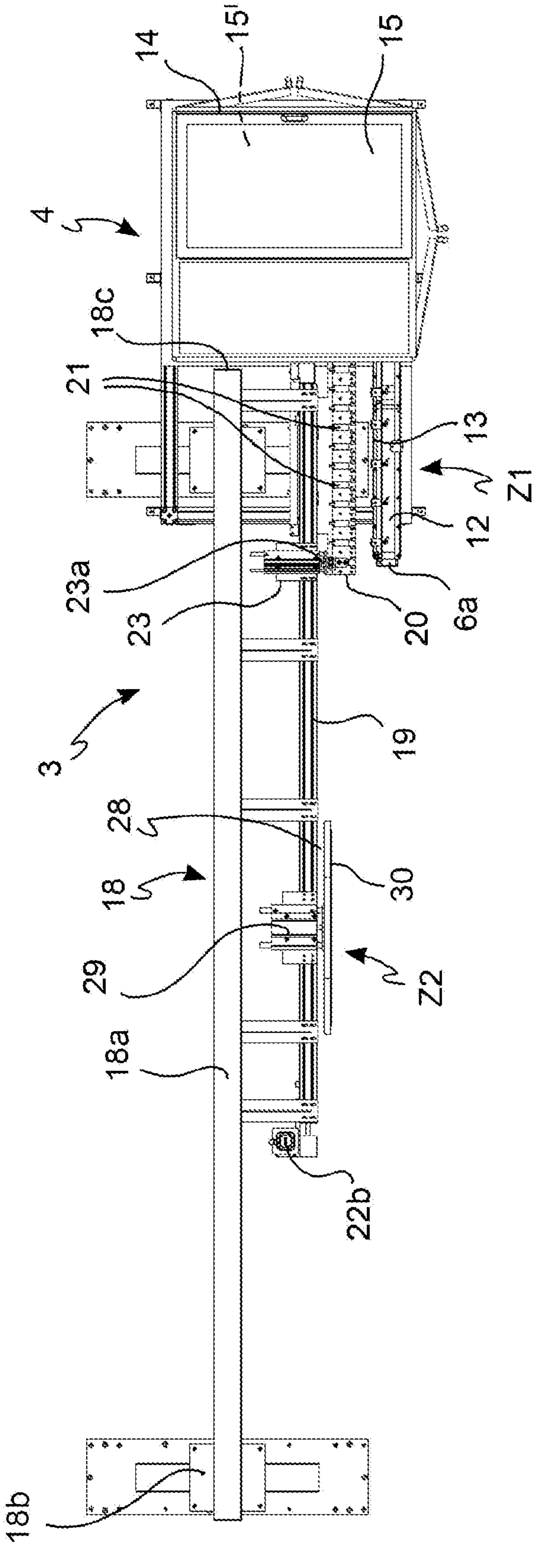
FIG. 8 depicts a top plan view of the transfer unit in FIG. 7.

The sequencer member 5 comprises a vibrating tub 7, open at the top, placed on a pedestal 8 comprising an actuator operatively connected to a frequency variator 9 for the operation of the vibrating tub 7. The upside-down truncated-cone-shaped vibrating tub 7 comprises, along the inner surface thereof, an ascending helicoidal guide 10, along which, due to the vibration, the reinforcement plates PR rise neatly up close to the upper edge 7*a*, so as to reach a chute 11 arranged outside the vibrating tub and configured to allow the movement and correct orientation of the reinforcement plates PR progressively towards the carrier storage 6. It should be noted that the reinforcement plates PR comprise a flat portion PP and a thrust portion PS with a U-shaped profile and, when sliding along the chute 11, they must be oriented as shown in FIG. 5, i.e., with the thrust portion PS facing the outer surface of the vibrating tub 7. In particular, as shown in FIG. 6B, the distal portion 11' of the chute 11 comprises a rounded step 11" and a guide 11*a* in which the thrust portion PS of the plate PR is inserted. Thereby, the thrust portion PS of the reinforcement plates PR fed along the chute 11 engages the guide 11*a* keeping the base of the U against the vibrating tub 7, whereas, by gravity, the flat portion PP is oriented downwards, keeping the same orientation until it reaches the carrier storage 6, where the support surface of the plates PR is gradually switched from vertical to horizontal.

The carrier storage 6 comprises a flat ribbon-shaped plaque 12, which unwinds along a longitudinal axis Z-Z and on which a guide edge 13 is arranged. The guide edge 13 is vertically spaced apart from the flat plaque 12, so that between the guide edge 13 and the surface of the flat plaque 12, there is a gap adapted to cause the flat portion PP of the reinforcement plate PR to slide therebelow. The guide edge 13 is positioned so as to be placed above the junction point between the thrust portion PS and the flat portion PP of the reinforcement plate PR.

The distal end of the flat plaque 12 comprises a stop profile 6*a* so as to allow the reinforcement plates PR to be stored on the carrier storage 6, on which the plates PR are neatly positioned in contact with one another. The feeding of the reinforcement plates PR from the chute 11 to the stop profile 6*a* occurs both by gravity and due to the vibration transmitted by the vibrating tub 7.

In certain embodiments, as shown in the figures, the supply unit 4 or part thereof can be enclosed in a containment structure 14, typically consisting of transparent panels and comprising an upper door 15 and optionally side doors 15' for inspecting and loading the reinforcement plates PR into the vibrating tub 7. The supply unit 4 can be supported by a base 17 with the pedestal 8 of the vibrating tub and respective feet 16 of the carrier storage 6 place in-between.

The transfer unit 3 for transferring the reinforcement plates PR comprises a bridge structure 18 comprising a horizontal beam 18*a* and a support leg 18*b* and is configured to straddle the working unit 2.

The horizontal beam 18*a* comprises an end 18*c* proximal to the sequencer member 5 and ending above the carrier storage 6. The horizontal beam 18*a* comprises a horizontal guide 19, arranged parallel to the longitudinal axis Z-Z, beside the flat plaque 12. A slide 20 comprising a plurality of seats 21 is slidingly placed on the horizontal guide 19, each of which is dimensioned to accommodate a reinforcement plate PR. The slide 20 is horizontally moved by an appropriate belt actuator 22*a* operated by a motor drive 22*b* and is movable between a gripping position Z1 and a transfer position Z2 of the reinforcement plates PR.

A gripping member 23 for gripping the reinforcement plates PR is secured to the guide 19 (or directly to the beam 18*a* or other structure connected thereto) at the distal end of the carrier storage 6. The gripping member 23 (commonly also known as a "pick-and-place" device) comprises a movable arm 23*a*, which is movable, transversely to the flat plaque 12 and the slide 20, between a gripping position at (i.e., above) the flat plaque 12 and a release position at (i.e., above) the slide 20. The movable arm 23*a* distally comprises a vertical guide 24 on which a slider 25 is slidingly placed, ending at the bottom with a bracket 26 supporting suction heads 27 (in the embodiment shown, two suction heads 27, but there could also be only one or more than two) connected by means of a tubing 27*a* to suction means (not shown).

Figure 9B:
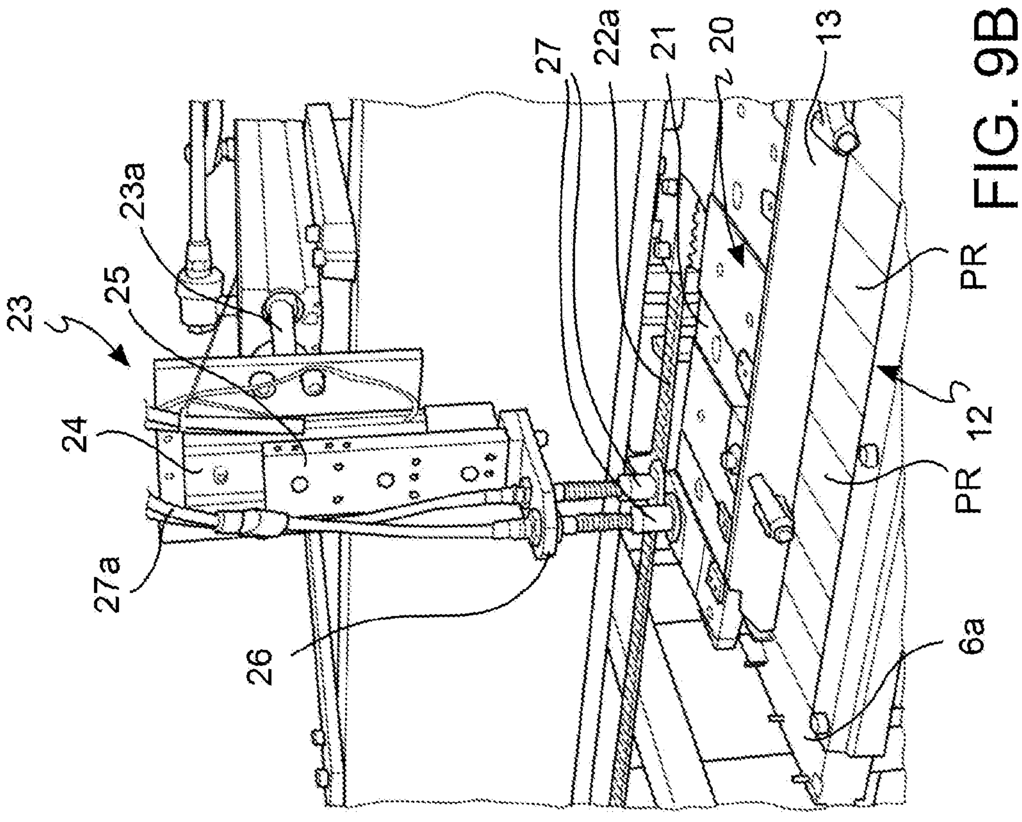
FIGS. 9A and 9B depict a perspective view of a detail of the transfer unit in FIG. 7 in two different operating conditions.
Figure 9A:
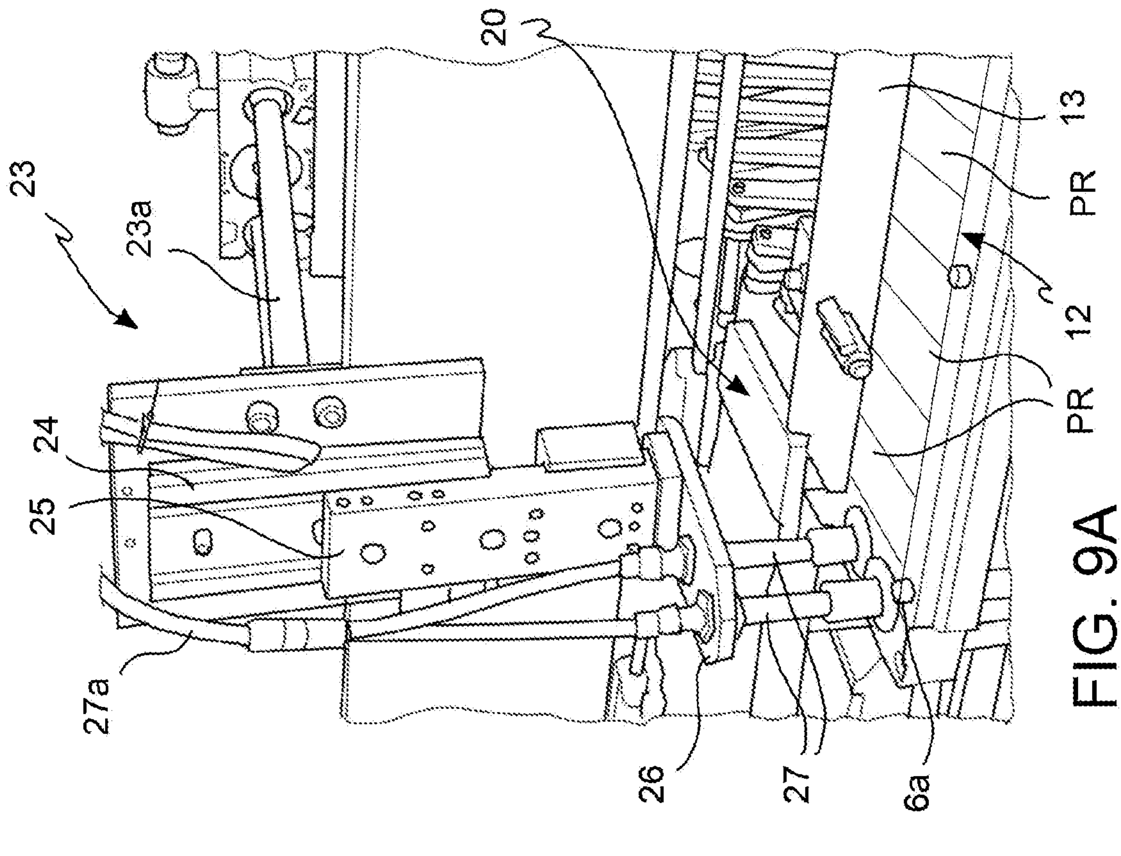

As illustrated in FIGS. 9A and 9B, by virtue of the transversal movement of the movable arm 23*a* and the vertical movement of the slider 25, the suction heads 27 take the reinforcement plates PR one by one (by means of suction) from the flat plaque 12 and deposit them (by releasing the suction) into the respective seats 21 of the slide 20. The slide 20 is moved longitudinally to the flat plaque 12 in discrete positions, from time to time in alignment with the gripping member 23 and thus with the plate PR to be loaded, so as to allow filling all the seats 21 of the slide 20. The number of seats 21 will depend on the number of reinforcement plates PR to be inserted into a panel P in the next working step.

A first thrust member 28 is secured to the guide 19 (or directly to the beam 18*a* or other structure connected thereto), at the transfer position Z2. The thrust member 28 comprises a plate 30 movable along an axis perpendicular to the longitudinal axis Z-Z, by a linear actuator 29. The plate 30 comprises a plurality of thrust teeth 31 adapted to abut against the thrust portion PS of the reinforcement plates PR, moving them transversely to the slide 20 so as to cause them to exit from the corresponding seats 21, as will be disclosed below.

Figure 10B:
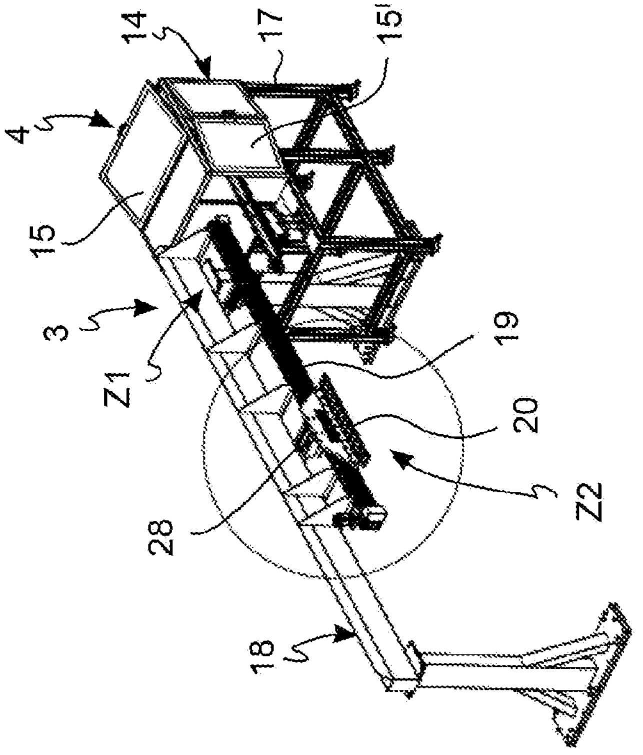
FIGS. 10A and 10B depict perspective views of the transfer unit in FIG. 7 in two different operating conditions.
Figure 10A:
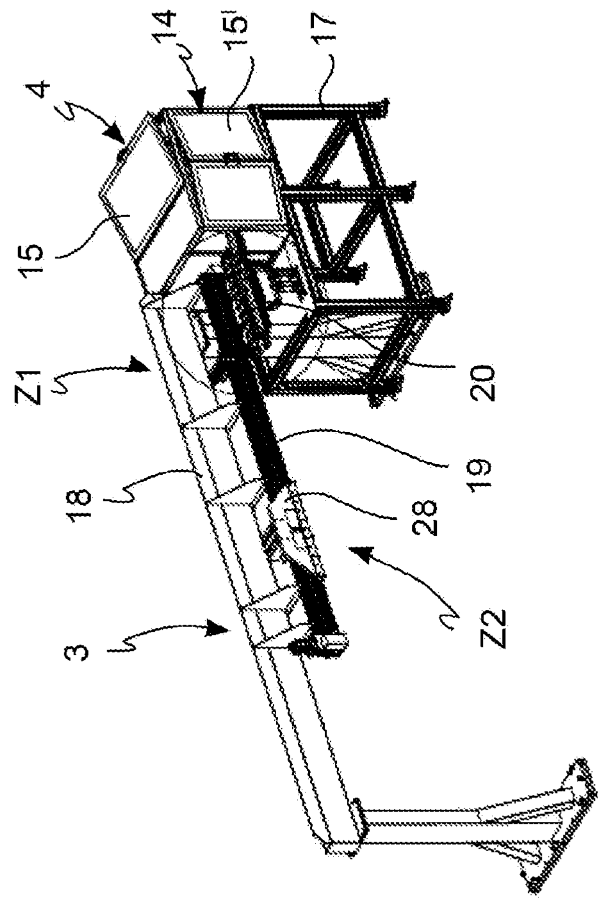

FIGS. 10A and 10B illustrate the step of moving the slide 20 from the gripping position Z1 (FIG. 10A) to the transfer position Z2 (FIG. 10B).

As shown in FIG. 11, the working unit 2 extends along a longitudinal axis W-W transversal to the axis Z-Z of the transfer unit 3 and is overstepped by the latter. The working unit 2 comprises a carriage 32 supported on a guide 33 and movable by an appropriate motor drive 34 along the longitudinal axis W-W according to a law of motion which will be described below.

The carriage 32 is connected at both the upstream side 32*a* and the downstream side 32*b* to a first end 36 of respective pantograph support members 35*a*, 35*b*, while the opposite end 37 of the pantograph support members 35*a*, 35*b* is connected to respective fixed supports 38 anchored to the ground. The term “downstream” or “upstream” refers to the working direction, i.e., the feeding direction of the panels P to be fitted, indicated by arrow B in FIG. 11.

In all FIGS. 11-14, the pantograph support member 35*b*, placed downstream, is shown in a disconnected condition from the carriage 32, but it should be understood that, under operating conditions, it will be secured to the respective downstream side 32*b* of the carriage 32.

The pantograph support members 35*a*, 35*b* comprise an articulated parallelogram bar system 39 ending at the top with rollers 40 (FIG. 14) adapted to support the panel P sliding thereabove.

Figure 14:
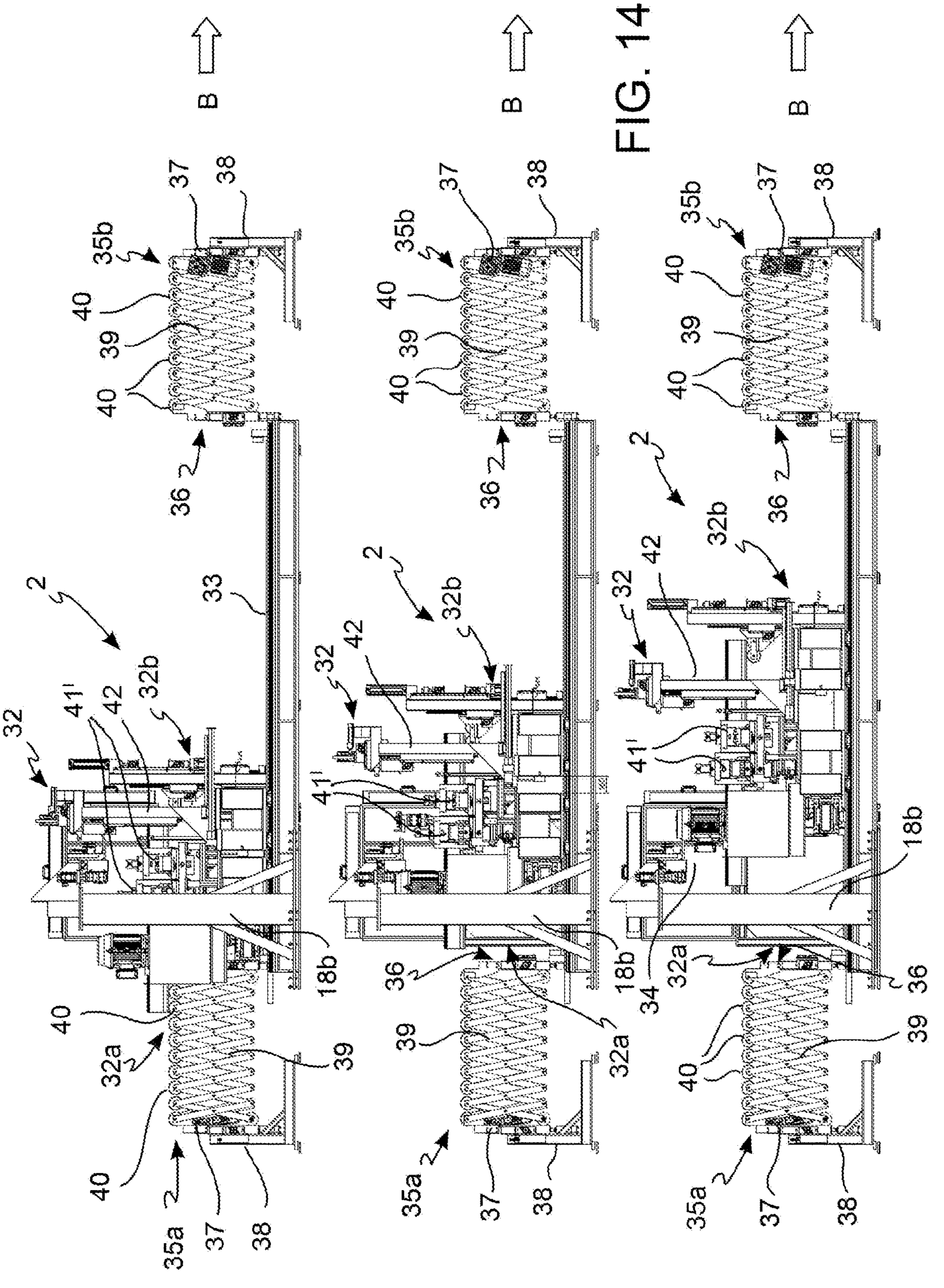
FIG. 14 depicts a side view of the equipment of the invention according to direction A in FIG. 11 in three different operating conditions.

The carriage 32 comprises a die assembly 41 adapted to perform the cutting and deformations shown in FIG. 3*b*. In FIG. 14, two dies 41' are visible on one side, but one or two dies 41" are also present on the opposite side. A second thrust member 42 configured to insert the reinforcement plates PR into the layer PU of the panel P is placed downstream of the die assembly 41, with respect to direction B.

The geometry and movement of the dies 41', 41" closely depend on the type and amount of the cuts and deformations to be imparted to the sheet L2, as shown in FIGS. 3A and 3B, whereby they will not be described in detail, since they are within the reach of those skilled in the art of metal sheet dies.

In some embodiments, as shown in the figures, the die assembly 41 is mounted on a transversal guide 41*a* which allows the removal thereof, in the case of intervention for maintenance or when the production line does not consider the use thereof (production of panels not of the “standing seam” type).

Figure 12A:
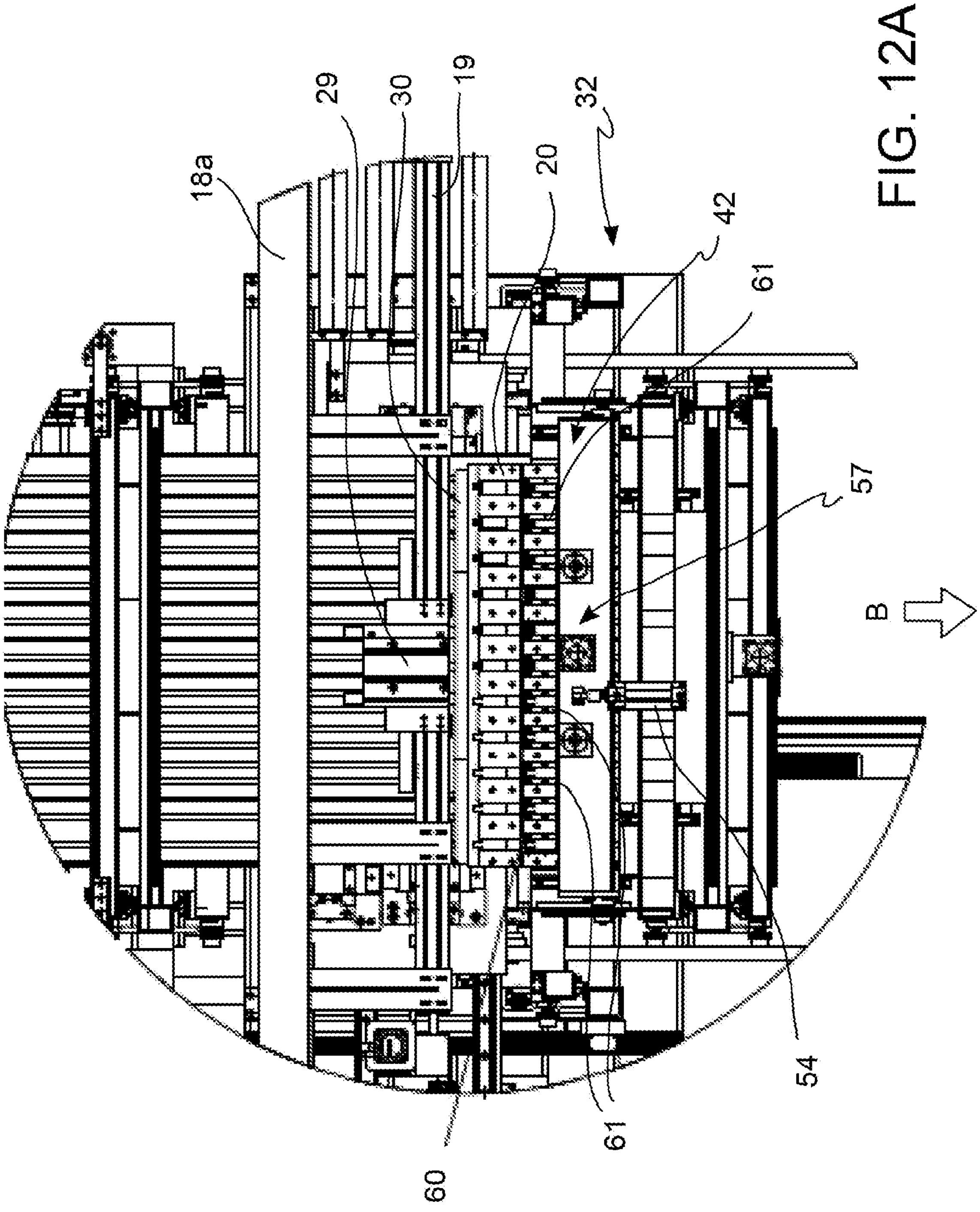
FIG. 12A depicts a top plan view of a detail of the equipment in FIG. 11 in an operating condition.
Figure 12B:
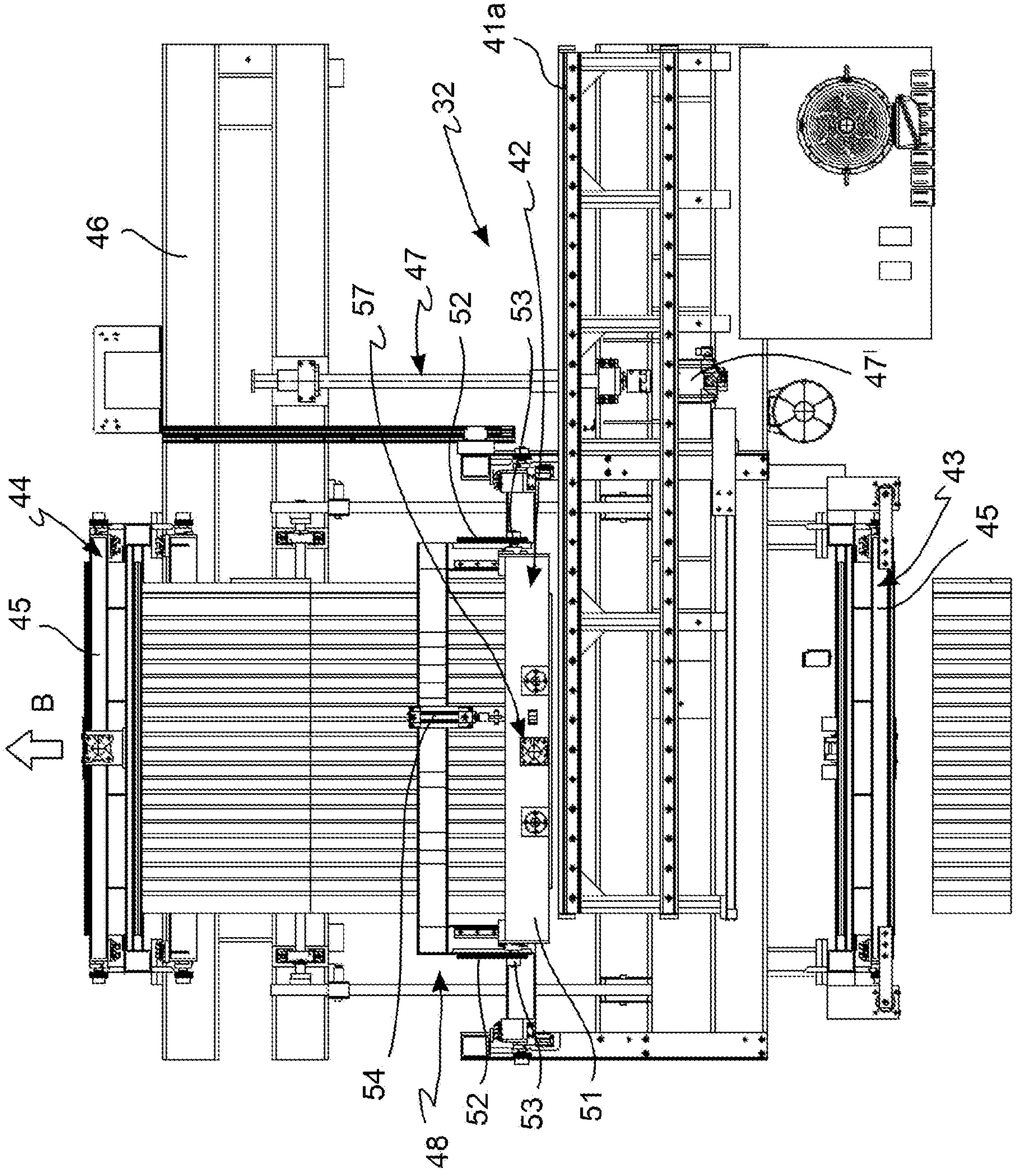
FIG. 12B depicts another top plan view of the detail in FIG. 12A in a different operating condition.
Figure 12C:
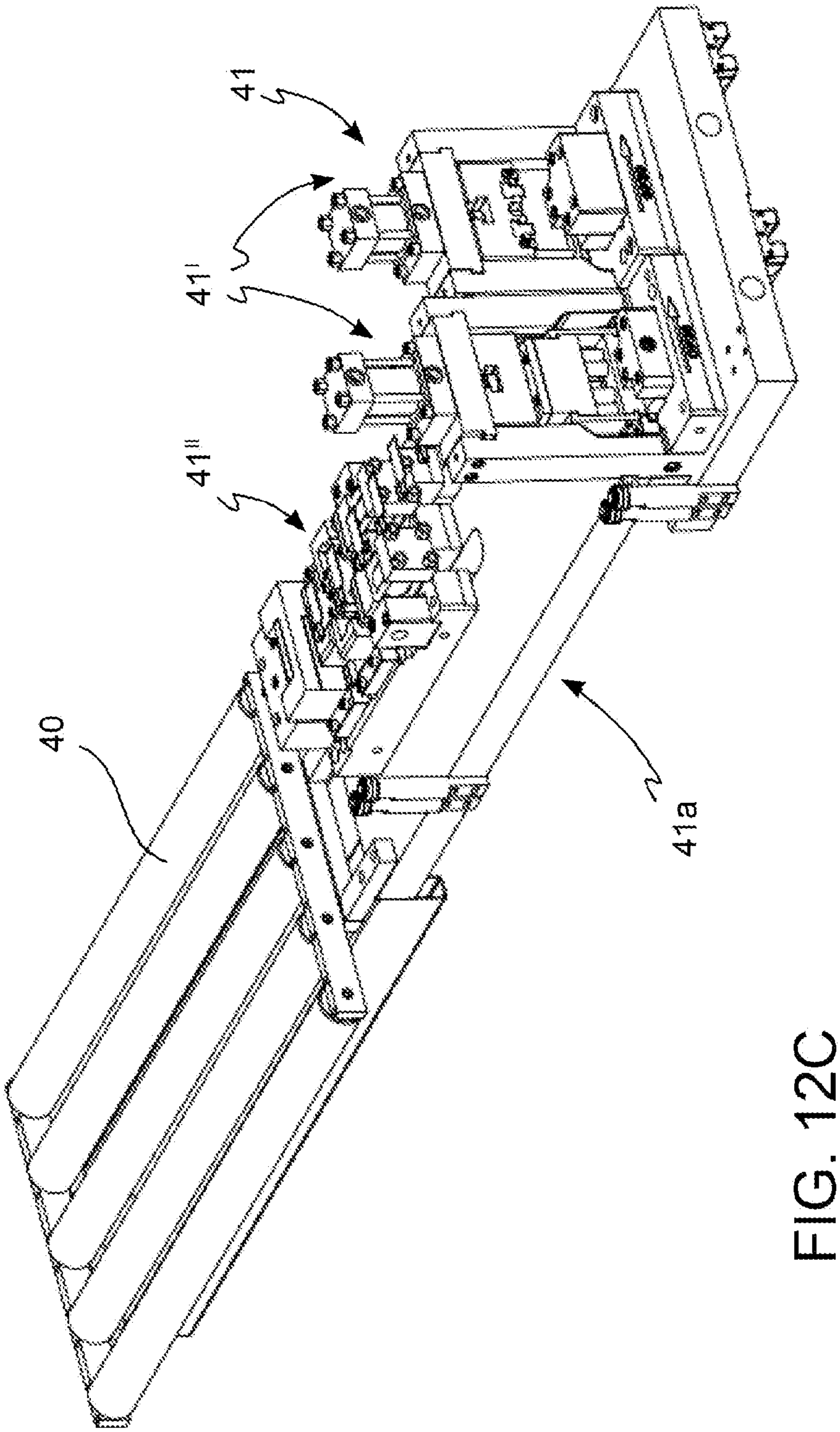
FIG. 12C depicts a perspective view of the dies for deforming and cutting the sheet of the "standing seam" panels.

FIG. 12C shows a simplified view of the die assembly 41. The dies 41 are mounted on the transversal guide 41*a* in a laterally offset position, i.e., in a non-operating condition. When producing the “standing seam” panel, the die assembly 41 will move to the left, arranging the first dies 41' on one side of the rollers 40 and the second die 41" on the opposite side. The function of the dies 41', 41" is to cut and deform the end of the upper sheet L2 of the “standing seam” panel (see FIGS. 2 and 3B). The first two dies 41', visible on the right, are arranged vertically and perform, in this order, the cutting and deformation of the sheet, respectively. The second die 41" on the left is arranged horizontally and is a combined die which performs both the cutting and the deformation of the opposite side of the sheet L2. The die assembly 41 comprises introduction guides (not shown) to allow easily inserting the sheet into the die when starting the production.

The carriage 32 further comprises a first clamp 43 for anchoring a first panel P being worked and a second clamp 44 for anchoring a second panel P being worked, where the first clamp 43 is placed upstream of the dies 41 and the second clamp 44 is placed downstream of the second thrust member 42 with respect to the feeding direction B of the panels P being worked.

The clamps 43, 44 comprise a transversal bar 45 mounted on vertical guides and movable, due to the action of appropriate actuators, between a raised or release position of the panel P and a lowered or stop position of the panel P against the rollers 40 of the pantograph support members 35*a*, 35*b*.

The second clamp 44 is installed on a movable base 46 operatively connected to an actuator member 47, 47', so as to take, along the longitudinal axis W-W, a proximal position and a distal position with respect to the second thrust member 42. In the proximal position, the second clamp 44 moves integrally with the carriage 32, whereas when switching from the proximal position to the distal position, the second clamp 44 is subjected to a relative movement with respect to the carriage 32 (and thus with respect to the first clamp 43) along the sliding direction B of the panels P being worked.

Figure 13:
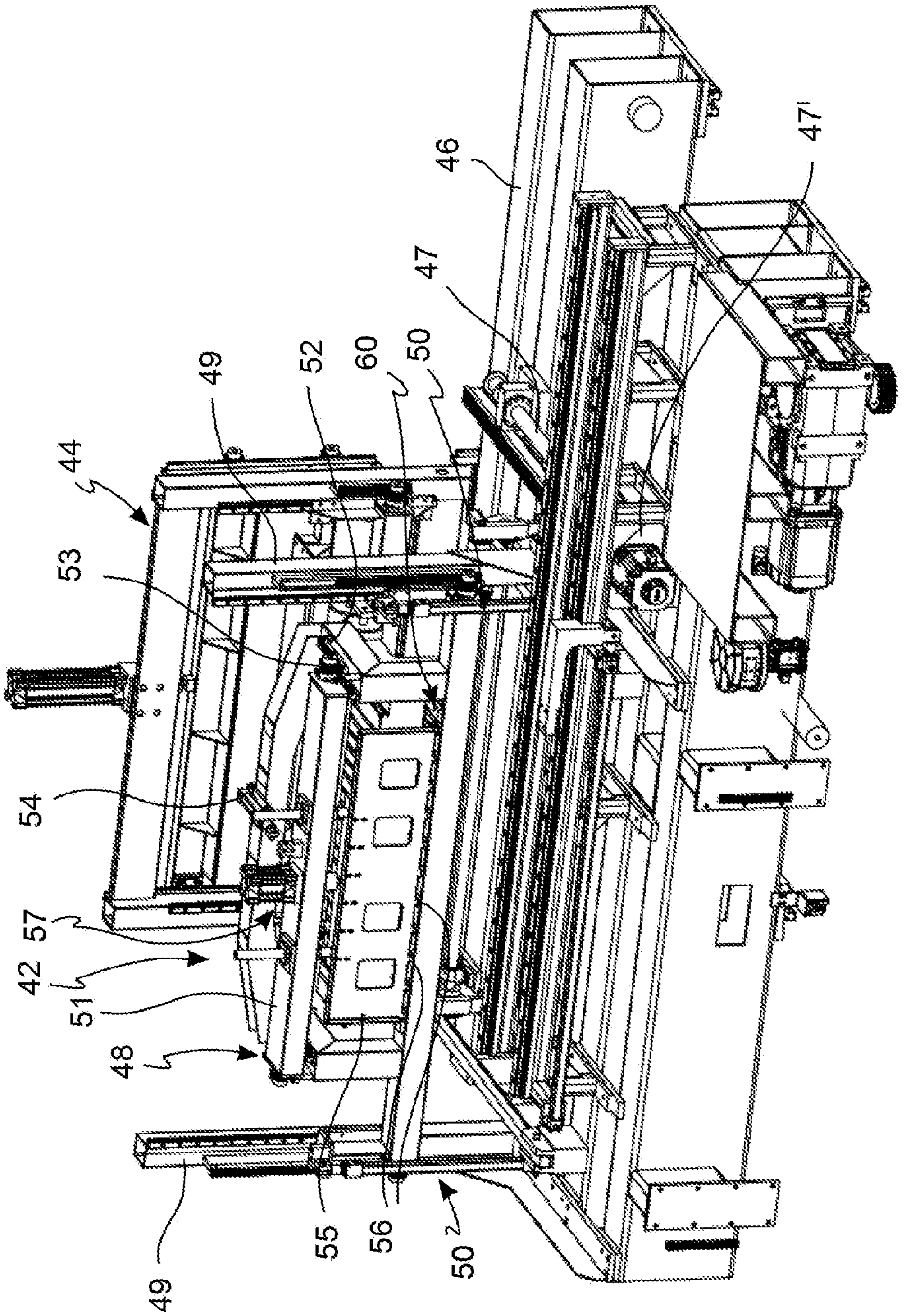
FIG. 13 depicts a perspective view of a detail of the panel working unit of the equipment in FIG. 11.

The second thrust member 42, shown in further detail in FIG. 13, comprises a frame 48. The frame 48 is mounted on vertical guides 49 so that the second thrust member 42 is movable, by an actuator 50, between a lowered or insertion position of the reinforcement plates PR into the panel P (in which the second thrust member 42 is at the layer PU of the panel P), and a raised or loading position of the plates PR (in which the second thrust member 42 is in the transfer position Z2 at the first thrust member 28 and the slide 20 carrying the support plates PR).

The frame 48 supports a template 60 comprising a plurality of seats 61 for the reinforcement plates PR that, during the step of loading the plates PR from the slide 20, are aligned with the seats 21 of the slide 20.

The frame 48 further comprises a movable bar 51 supporting a thrust plate 55 provided with a plurality of downward protruding teeth 56, one for each reinforcement plate PR to be inserted into the panel P. The thrust plate 55 is movable, by an actuator 57, between a raised non-operating position and a lowered operating position, in which the teeth 56 are placed in a thrust position at the seats 61 of the template 60.

The movable bar 51 slides along the longitudinal axis W-W on a track 52 by means of wheels 53 and is moved by an actuator 54 secured to the frame 48. The movable bar 51 is movable between a first position, in which the teeth 56 of the thrust plate 55 are vertically aligned with one end upstream of the seats 61 of the template 60 (i.e., the end where the thrust portions PS of the plates PR are positioned), and a second position, spaced apart from the first position along the sliding direction B of the panel P, in which the teeth 56 are vertically aligned with the opposite end of said seats 61. Thereby, the movement of the movable bar 51 from the first to the second position, when the thrust plate is in the lowered operating position, causes the thrust along the direction B of the plates PR and thus, as will be shown below, the insertion thereof into the layer PU of the panel P.

The operation of the equipment 1 is described below.

The slide 20 carrying the previously loaded reinforcement plates PR (see the description above) is moved from the gripping position Z1 to the transfer position Z2, where the first thrust member 28 transfers the plates PR to the template 60 of the second thrust member 42 which at this point is in the raised position. The slide 20 is then taken back to the gripping position Z1 in which it is loaded with another plurality of reinforcement plates PR.

At the same time, the panels P—obtained upstream of the equipment 1 for forming a continuous panel strip in a double conveyor machine and then cutting it for singularizing the panels P—are continuously fed to the equipment 1, where they abut against one another and with the upper sheet L2 facing downwards. When two adjacent panels P have reached the carriage 32, the clamps 43, 44 are taken from the release position to the stop position of the panels P, and in particular the first clamp 43 stops an upstream panel P against the rollers 40 while the second clamp 44 stops the immediately downstream panel P against the respective rollers 40.

At this point, the movable base 46 of the second clamp 44 is moved in the direction B so that the tail end of the downstream panel P is separated from the head end of the following panel P. The movable base 46 makes a first and a second stop, at the first and second dies 41 for cutting and deforming the upper sheet L2, then it is taken to the distal position, which is immediately downstream of the second thrust member 42.

At this point, the frame 48 of the second thrust member 42, which was in the raised position for transferring the plates PR from the slide 20 to the template 60, is taken to the lowered position and immediately afterwards, in sequence, the thrust plate 55 is taken to the lowered operating position and the movable bar 51 is advanced to the corresponding distal position. Thereby, the teeth 56 push the thrust portion PS of the plates PR, causing them to entirely penetrate the layer PU of the tail end of the panel P being worked.

The clamps 43, 44 are then raised and the downstream panel P, now arranged as required, continues along the corresponding rollers 40. The process is then continued on the upstream panels P as shown so far.

Therefore, the equipment 1 according to the invention allows achieving the preset objects, providing a system for automatically fitting panels of the "standing seam" type in line, i.e., without the intervention of manual operations as in the prior art.

It is apparent that only some particular embodiments of the present invention have been described, to which those skilled in the art will be able to make all the required changes for the adaptation thereof to particular applications, without however departing from the scope of protection defined by the claims of the present invention.

The invention claimed is:

1. Equipment for standing seam fitting panels for insulating covers, and for insulating housing roofs, comprising an upper sheet, a lower sheet and an expanded polymer intermediate layer, the equipment comprising: a working unit, extending along a longitudinal axis, a transfer unit extending along a longitudinal axis, the longitudinal axis being horizontal and perpendicular to the longitudinal axis of the working unit, a supply unit for supplying reinforcement plates comprising a thrust portion and a flat portion, wherein the working unit comprises a carriage, which is movable along the longitudinal axis, said carriage comprising dies configured to cut and deform one end of the upper sheet of said panels and a thrust member for introducing a plurality of reinforcement plates into a tail end of the expanded polymer intermediate layer, said thrust member being placed downstream of said dies along a working direction of said panels.

2. The equipment according to claim 1, wherein the carriage comprises an upstream side and a downstream side and is connected both at the upstream side and at the downstream side with a first end of corresponding pantograph support members, said pantograph support members comprising an articulated parallelogram bar system terminating at a top with rollers adapted to support the panel sliding above the rollers.

3. The equipment according to claim 1, wherein the carriage comprises a first clamp for anchoring a first panel during working and a second clamp for anchoring a second panel during working, wherein the first clamp is placed upstream of the dies and the second clamp is placed downstream of the thrust member of the carriage, with respect to a feeding direction of the panels during working.

4. The equipment according to claim 3, wherein the second clamp is installed on a base, which is movable along the longitudinal axis between a proximal position and a distal position with respect to the thrust member of the carriage, wherein, in the proximal position, the second clamp moves integrally with the carriage, while, during passage from the proximal position to the distal position, the second clamp is subjected to a relative movement with respect to the carriage and therefore with respect to the first clamp along a sliding direction of the panels under working.

5. The equipment according to claim 1, wherein the thrust member of the carriage comprises a frame, which is movable between a lowered position, or a position of inserting the reinforcement plates into the panel, wherein said thrust member is at the intermediate layer of the panel, and a raised position, or a position of loading the plates from the transfer unit to the carriage.

6. The equipment according to claim 5, wherein the frame supports a template comprising a plurality of seats for the reinforcement plates, the frame further comprising a movable bar, which supports a thrust plate provided with a plurality of teeth protruding downwards, one of the teeth for each reinforcement plate to be inserted into the panel, wherein the thrust plate is movable between a raised non-operating position and a lowered operating position, in which the teeth are placed in a thrust position at the seats of the template.

7. The equipment according to claim 6, wherein the movable bar is sliding along the longitudinal axis between a first position, in which the teeth of the thrust plate are vertically aligned with one end upstream of the seats of the template, and a second position, spaced apart from the first position along the sliding direction of the panel, in which the teeth are vertically aligned with the opposite end of said seats.

8. The equipment according to claim 1, wherein the supply unit for supplying the reinforcement plates comprises a sequencer member and a carrier storage, the sequencer member comprising a vibrating tub, which comprises, along an inner surface thereof, an ascending helicoidal guide, at the top of which, a chute branches off, arranged externally of the vibrating tub, configured to allow movement and orientation of the reinforcement plates in progression towards the carrier storage.

9. The equipment according to claim 8, wherein the chute comprises a distal portion comprising a rounded step and a guide into which the thrust portion of the reinforcement plates is inserted, wherein the flat portion is oriented downwards by gravity.

10. The equipment according to claim 8, wherein the carrier storage comprises a flat ribbon-shaped plaque, which unwinds parallel to the longitudinal axis and on which a guide edge is arranged, the guide edge being vertically spaced apart from the flat plaque, so that a gap is between the guide edge and the surface of the flat plaque, the gap being adapted to cause the flat portion of the reinforcement plate to slide below the gap, and wherein the flat plaque distally comprises a stop profile of the reinforcement plates.

11. The equipment according to claim 1, wherein the transfer unit for transferring the reinforcement plates comprises a bridge structure comprising a horizontal beam configured to straddle the working unit, the horizontal beam comprising a horizontal guide, arranged parallel to the longitudinal axis, on which a slide is slidably placed, the slide comprising a plurality of seats, each of the plurality of seats being dimensioned to accommodate a reinforcement plate, the slide being horizontally movable between a gripping position and a transfer position for transferring the reinforcement plates.

12. The equipment according to claim 11, wherein a gripping member for gripping the reinforcement plates is secured to the guide or to the beam or to another structure connected thereto, at a stop profile of the carrier storage, and comprises a movable arm, which is transversely movable with respect to the flat plaque and to the slide, between a gripping position at the flat plaque and a release position at the slide.

13. The equipment according to claim 12, wherein the movable arm distally comprises a vertical guide onto which a slider is slidably placed, the slider terminating at a bottom with a bracket supporting suction heads.

14. The equipment according to claim 11, the thrust member being secured to the guide or to the beam or to another structure connected thereto, at the transfer position, said thrust member of the transfer unit comprising a plate, which is movable along an axis parallel to the longitudinal axis of the working unit, wherein the plate comprises a plurality of thrust teeth adapted to abut against the thrust portion of the reinforcement plates.

* * * * *